Figure 1:
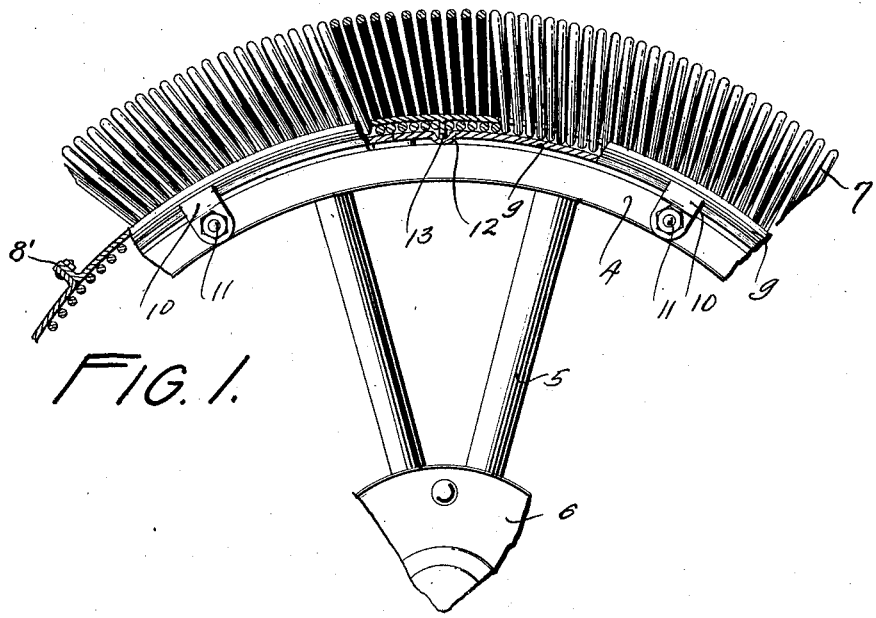

J. M. JONES.
RESILIENT TIRE.
APPLICATION FILED MAR. 4, 1918.

1,313,541.                                                  Patented Aug. 19, 1919.

INVENTOR
John M. Jones

WITNESSES

BY

ATTORNEY

UNITED STATES PATENT OFFICE.

JOHN M. JONES, OF ST. JOSEPH, MISSOURI.

RESILIENT TIRE.

1,313,541.  Specification of Letters Patent.  Patented Aug. 19, 1919.

Application filed March 4, 1918. Serial No. 220,308.

*To all whom it may concern:*

Be it known that I, JOHN M. JONES, a citizen of the United States, residing at St. Joseph, in the county of Buchanan and State of Missouri, have invented certain new and useful Improvements in Resilient Tires, of which the following is a specification.

This invention relates to resilient tires, having for its primary object to provide a tire of simple and improved construction capable of being readily applied to or removed from a vehicle rim, and which is constructed of such material and in such manner as to eliminate the inconvenience incident to the use of penumatic tires.

A further object of the invention is to provide a tire of the character mentioned which is formed of a coil spring and arranged in such manner as to be applied snugly to a vehicle rim, and which has its convolutions so arranged that a number of the convolutions will contact the ground at the same time, whereby danger of breakage or derangement of the various convolutions is obviated.

A still further object of the invention is to provide a tire of the character mentioned which will possess the desired and requisite elasticity, and which is equipped with improved means for preventing the tire slipping upon the demountable rim which supports the same.

With these objects in view, together with others which will appear as the description proceeds, the invention resides in the novel formation, combination, and arrangement of parts, all as will be described more fully hereinafter, illustrated in the drawings, and particularly pointed out in the claim.

In the drawings:—

Figure 2:
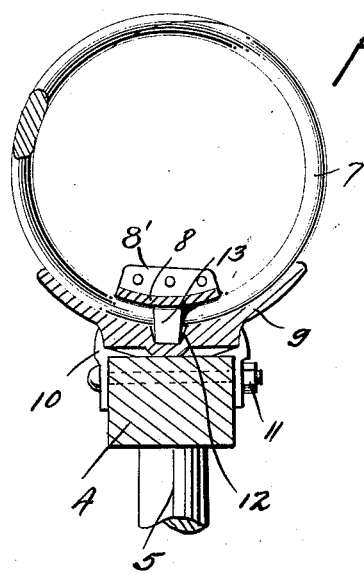
Figure 3:
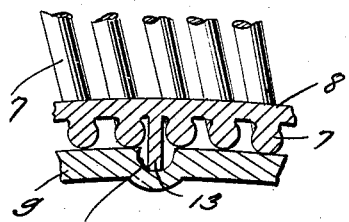

Figure 1 is a fragmentary view, parts broken away, of a tire constructed in accordance with the invention, showing the manner in which the tire is applied to a wheel rim, Fig. 2 is an enlarged transverse sectional view through the wheel rim and the improved tire, and Fig. 3 is a fragmentary longitudinal view taken through a part of the tire and a demountable rim and illustrating the manner in which these elements are assembled.

In the drawings, 4 indicates a felly, 5 the spokes, and 6 the hub of a conventional form of vehicle wheel, such as that now commonly used in connection with motor vehicles.

The tire of my invention is indicated generally at 7, and comprises a coil spring having its convolutions disposed relatively close together, and this spring is adapted to be arranged around and to be supported by the felly 4 of the wheel. It will be observed that the various convolutions of the coil spring are disposed at a slight angle, so that a relatively great number of these convolutions will contact the ground at the same time.

Arranged within the tire 7 and extending throughout the circumference of the latter is a band 8. This band rests upon the inner portions of the convolutions of the tire, and it is preferably welded thereto as is shown in Fig. 3. By arranging the tire and band in this manner it is obvious that a unitary structure is provided.

The demountable rim for supporting the tire is indicated at 9, and is adapted to be held rigidly upon the wheel felly by the blocks or clencher members 10, held in proper position upon the vehicle wheel felly by bolts and nuts 11. The demountable rim is provided in its outer surface with a number of spaced depressions 12, within which the lugs 13 projecting inwardly from the band 8 engage. The meeting ends of the band 8 may be fastened together in any preferred manner as indicated at 8' in Fig. 1. The ends of the coil spring forming the tire may be brought together at the point where the ends of the band 8 are joined so that the convolutions of the spring may be welded to the band as shown. The structure may then be readily mounted in position.

After the tire has been rendered a unitary structure by the application of the band 8 thereto, the device may be applied to the demountable rim 9. The demountable rim with the tire attached is then applied to the vehicle wheel felly in the usual manner, and after the clencher members 10 have been properly attached to the wheel felly, the improved tire will be securely held in place.

In assembling the tire, the coil spring and band are applied to the demountable rim 9, and the lugs 13 projecting inwardly from the band engage in the recesses 12 and hold the spring and band against circumferential or lateral movement. The unitary structure thus provided is applied to the wheel felly in the same manner that the demountable rims now used are applied.

As a relatively great number of the convolutions of the spring 7 contact the ground at one time, the danger of distortion or breaking of any of the coils of the spring is obviated, and it is obvious that a tire constructed of a coil spring in the manner specified will not only supply the desired resiliency for the wheel, but will obviate the necessity for tire chains in wet weather or upon slippery streets.

While the present is a disclosure of the preferred embodiment of the invention, it is to be understood that the invention is not limited thereto, as various minor changes in the details of construction, proportion, and arrangement of parts may be resorted to if desired without departing from the spirit of the invention as defined by the appended claim.

I claim:—

In a device of the class described, an annular tire formed of a coil spring, a band within said spring and welded to all of the convolutions of the latter, a demountable rim, the said rim being provided with recesses, and lugs projecting from said band and being adapted to engage said recesses.

In testimony whereof I affix my signature in presence of two witnesses.

JOHN M. JONES.

Witnesses:
G. R. JONES,
JOHN A. WOOD.

Copies of this patent may be obtained for five cents each, by addressing the "Commissioner of Patents, Washington, D. C."